United States Patent [19]

Downs

[11] Patent Number: 5,689,800
[45] Date of Patent: Nov. 18, 1997

[54] VIDEO FEEDBACK FOR REDUCING DATA RATE OR INCREASING QUALITY IN A VIDEO PROCESSING SYSTEM

[75] Inventor: Terry Downs, Forest Grove, Oreg.

[73] Assignee: Intel Corporation, Santa Clara, Calif.

[21] Appl. No.: 494,013

[22] Filed: Jun. 23, 1995

[51] Int. Cl.⁶ ................................................ H04N 7/173
[52] U.S. Cl. ...................... 455/5.1; 348/12; 348/13; 348/17; 395/330; 395/200.04
[58] Field of Search .................. 348/15, 6, 7, 12, 348/9, 13, 14, 17, 16; 455/4.1, 4.2, 5.1; 395/326–332, 200.01, 200.04, 200.05; H04N 7/173

[56] References Cited

U.S. PATENT DOCUMENTS

| | | | |
|---|---|---|---|
| 4,949,169 | 8/1990 | Lumelsky et al. | 348/15 |
| 5,392,223 | 2/1995 | Caci | 348/17 X |
| 5,528,289 | 6/1996 | Cortjens et al. | 348/15 X |

Primary Examiner—John K. Peng
Assistant Examiner—Nathan J. Flynn
Attorney, Agent, or Firm—William H. Murray; N. Stephan Kinsella

[57] ABSTRACT

A video processing system and method for processing video signals in the video processing system. According to a preferred embodiment, the video processing system comprises a source system having a processor for encoding video data and a transmitter for transmitting the encoded video data to a destination system. The video processing system further comprises the destination system, which comprises a processor for decoding encoded video data; a display device for displaying the decoded video data in a window of a monitor in accordance with at least one window display parameter. The at least one window display parameter may be changed, and the destination system can notify the source system of changes in the at least one window display parameter.

18 Claims, 4 Drawing Sheets

FIGURE 2. DECODING SYSTEM

400

1

VIDEO FEEDBACK FOR REDUCING DATA RATE OR INCREASING QUALITY IN A VIDEO PROCESSING SYSTEM

BACKGROUND OF THE INVENTION

1. Field of the Invention

The present invention relates to signal processing, and, in particular, to computer-implemented processes and apparatuses for encoding and decoding video signals.

1. Description of the Related Art

This invention relates to signal processing which is often used to encode or compress video image signals representative of video pictures into an encoded bitstream. Each picture may be a still image, or may be part of a plurality of successive pictures of video signal data that represent a motion video. As used herein, "picture" and "video picture" may interchangeably refer to signals representative of an image as hereinabove described. Such video pictures are sometimes referred to as video frames in some usages.

The portion of an encoded bitstream representing a compressed picture may be stored in a mass storage device such as a hard disk drive or compact disk read-only-memory (CD-ROM) in its compressed format in order to conserve storage space. When the compressed picture is later retrieved it may be decompressed and, for example, displayed on a monitor. A higher amount of compression of the blocks constituting an image tends to lower the number of bits needed to represent the image, but also tends to diminish the quality of the image reconstructed by the decoder.

The encoded bitstream may also be transmitted from one signal processing system to one or more remote signal processing systems such as video conferencing nodes which decode the encoded signals. There may be only two video conferencing nodes in a point-to-point video conferencing system, or multiple video conferencing nodes in a multi-point video conferencing system. These video conferencing nodes may be personal computer (PC)-based systems communicating with each other over a selected transmission medium. Possible transmission media include Integrated Services Digital Network (ISDN) and Public Switched Telephone Network (PSTN) telephone connections. Although ISDN connections provide a higher bandwidth than PSTN connections, ISDN connections are currently less readily available and more expensive than PSTN connections.

Because transmission media have finite bandwidths, in order to provide video conferencing of satisfactory quality, each PC system preferably compresses or encodes in real time the video signals corresponding to the local participant and transmits the resulting compressed signals or bitstreams to the PC systems of the remote participants. In such a video conferencing system, each PC system also preferably receives and decompresses compressed signals from the PC systems of the remote participants to play the decompressed video signals locally.

In a video conferencing system, a source PC system encodes and transmits video data to at least one destination PC system over the available transmission medium. In a video conferencing environment, the destination PC system receives an encoded block of video data from the source PC system, which represents a window of data which may be displayed in a window on the screen of the destination PC system. This window may be smaller than the total screen display size and may depict, for example, a video image of the face of the user of the source PC system.

Occasionally the destination PC system needs to resize the window in which it is displaying the video data received from the source PC system, e.g. to a smaller size display window, or data in the window may be displayed at a lower quality or resolution for some reason. When this occurs, the source PC system is not aware of such changes and will continue to encode and transmit data to the destination PC system under the assumption the prior display window assumptions. The destination PC system may either scale the video data down to fit the smaller window, or simply ignore some of the decoded data if only a portion of the data received is to be displayed in the resized window, or otherwise process the data to comply with the revised display requirements.

In this event, the destination PC system receives more information than it needs for its resized window. Thus, communications bandwidth may be wasted in transmitting data that ultimately are not needed by the destination PC system, and/or the quality of the data encoded and transmitted is lower than it need be for a given bandwidth. Additionally, encoding bandwidth of the source PC is wasted, as well as decoding bandwidth of the destination PC in decoding, scaling or other processing of the encoded information. Thus, there is an inefficient use of processing or transmission bandwidth when the destination PC system changes its use of the encoded window of video data and the source PC system continues to encode video data under the assumption that the destination PC system is using and displaying the data at the same window size and resolution.

There is thus a need for methods and apparatuses for encoding video signals to reduce these inefficiencies.

SUMMARY

There is provided herein a video processing system and related method for processing video signals in the video processing system. According to a preferred embodiment of the invention, the video processing system comprises a source system having means for encoding video data and means for transmitting the encoded video data to a destination system. The video processing system further comprises the destination system, which comprises means for decoding encoded video data; means for displaying the decoded video data in a window of a monitor in accordance with at least one window display parameter; means for changing the at least one window display parameter; and means for notifying the source system of changes in the at least one window display parameter.

BRIEF DESCRIPTION OF THE DRAWINGS

These and other features, aspects, and advantages of the present invention will become more fully apparent from the following description, appended claims, and accompanying drawings in which:

DESCRIPTION OF THE PREFERRED EMBODIMENT

In the present invention, there is disclosed a method and apparatus for processing video signals. The destination system, which decodes encoded video signals from a source system, sends feedback to the source system to inform the source system of the destination system's requirements regarding the display window in which the video data is displayed. The size and resolution of the window which displays the information in the destination system, and related information, is transmitted to the source system to allow the source system to more efficiently encode and transmit the video data to the destination system. The present invention is described in further detail hereinbelow.

Video Processing System Hardware

Figure 1:
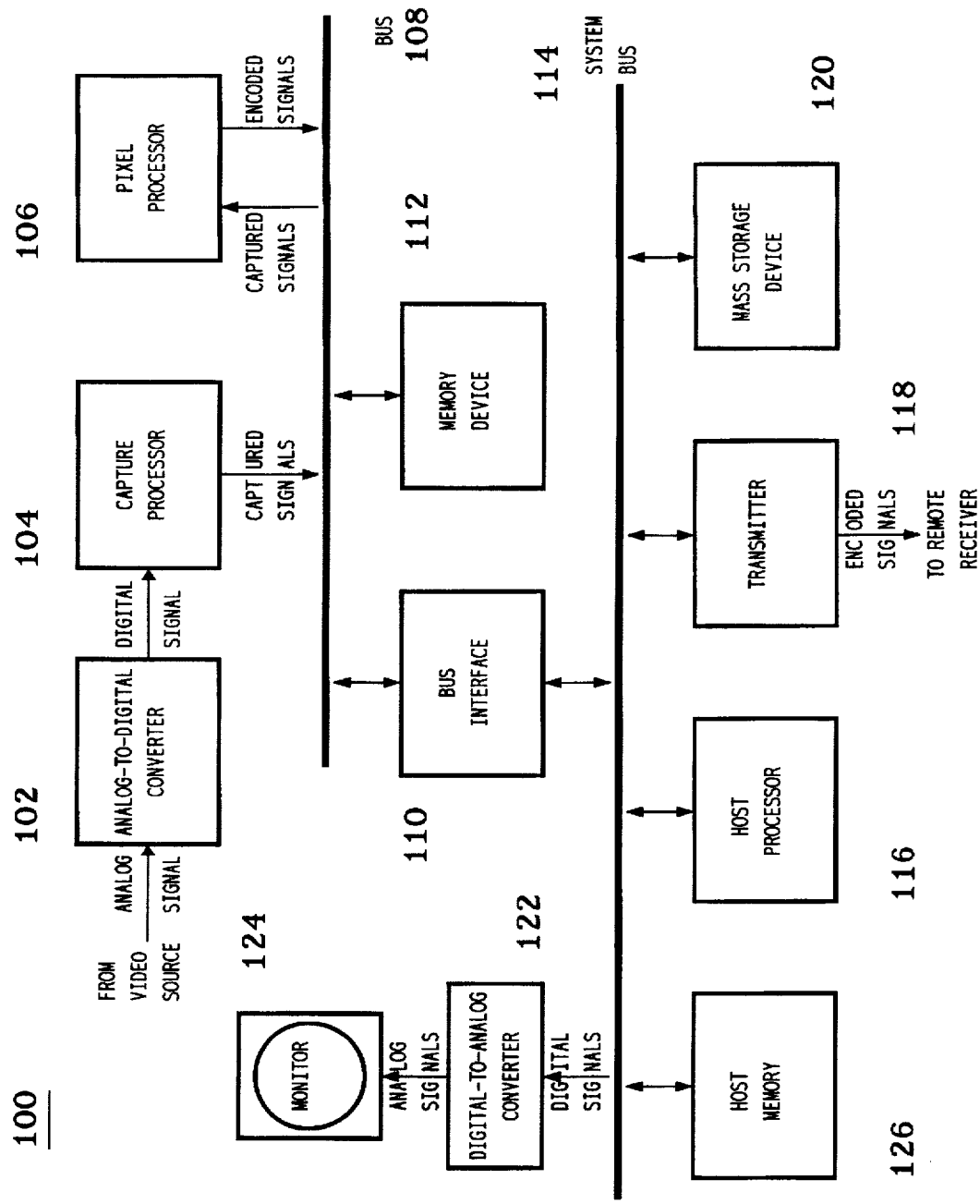
FIG. 1 is a computer-based encoding system for encoding video signals, according to a preferred embodiment of the present invention.

Referring now to FIG. 1, there is shown a computer-based encoding system 100 for encoding video image signals, according to a preferred embodiment of the present invention. Analog-to-digital (A/D) converter 102 of encoding system 100 receives analog video image signals from a video source. The video source may be any suitable source of analog video image signals such as a video camera or VCR for generating local analog video image signals or a video cable or antenna for receiving analog video image signals from a remote source. A/D converter 102 decodes (i.e., separates the signal into constituent components) and digitizes each picture of the analog video image signals into digital image component signals (e.g., in a preferred embodiment, Y, U, and V component signals).

Capture processor 104 receives, captures, and stores the digitized component signals as subsampled video images in memory device 112 via bus 108. Each subsampled video image is represented by a set of two-dimensional component planes or pixel bitmaps, one for each component of the digitized video image signals. In a preferred embodiment, capture processor 104 captures video image signals in a YUV9 or YUV4:1:1 format, in which every (4×4) block of pixels of the Y component plane corresponds to a single pixel in the U component plane and a single pixel in the V component plane.

Pixel processor 106 accesses captured bitmaps from memory device 112 via bus 108 and generates encoded image signals that represent one or more of the captured video images. Depending upon the particular encoding method implemented, as described in more detail below, pixel processor 106 applies a sequence of compression techniques to reduce the amount of data used to represent the information in each image. The encoded image may then be stored to memory device 112 via bus 108 for transmission to host processor 116 via bus 108, bus interface 110, and system bus 114 for storage in host memory 126.

Host processor 116 may transmit the encoded image to transmitter 118 for real-time transmission to a remote receiver (not shown in FIG. 1), store the encoded image to mass storage device 120 for future processing, or both. In addition, digital-to-analog converter 122 may receive and convert digital image signals to analog image signals for display in one or more windows on monitor 124. These image signals may correspond, for example, to raw captured video images or companded video images (i.e., the results of compressing and decompressing selected captured video images).

Figure 2:
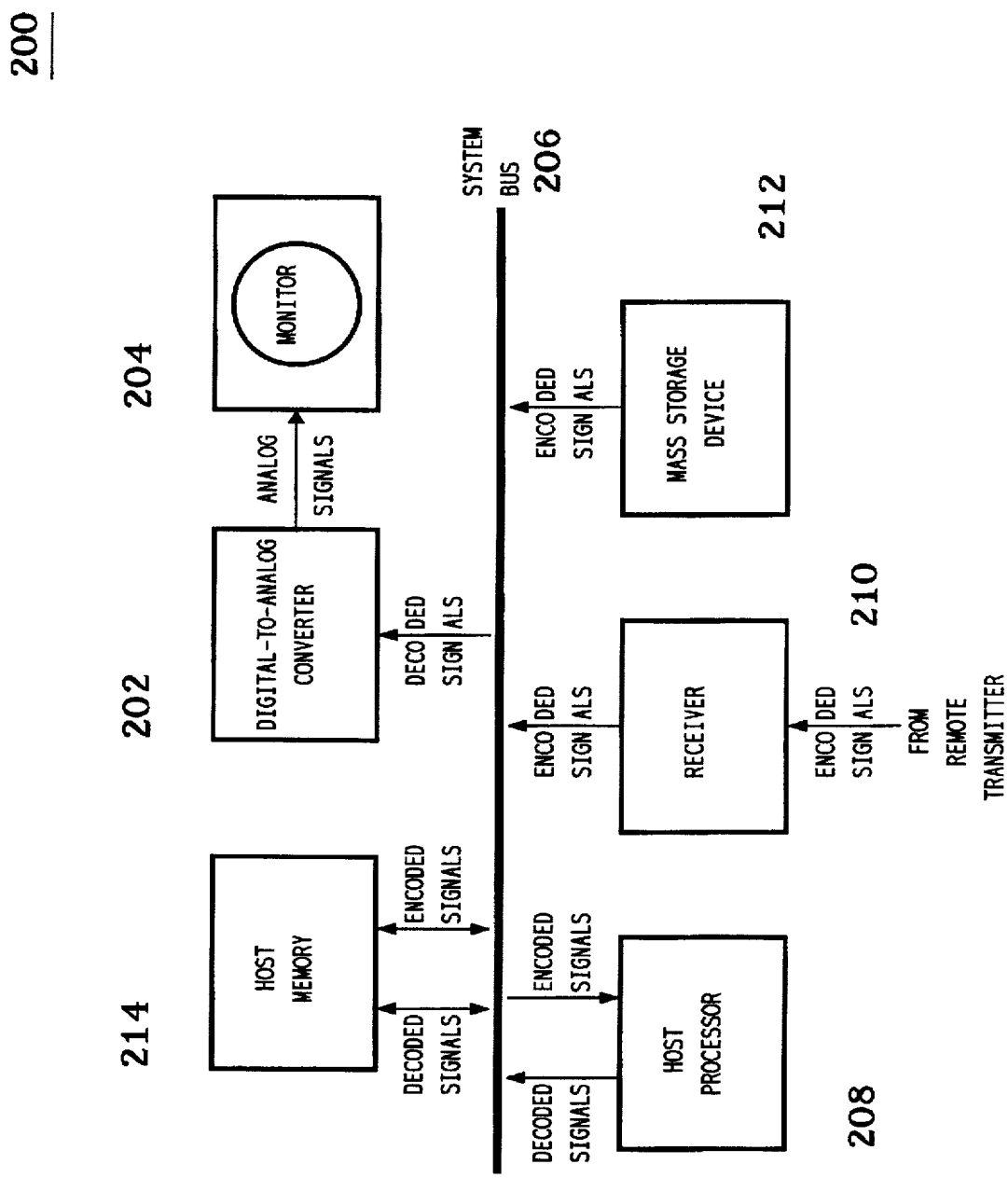
FIG. 2 is a computer-based decoding system for decoding the video signals encoded by the encoding system of FIG. 1, according to a preferred embodiment of the present invention.

Referring now to FIG. 2, there is shown a computer-based decoding system 200 for decoding the image signals encoded by encoding system 100 of FIG. 1, according to a preferred embodiment of the present invention. Host processor 208 of decoding system 200 receives encoded image signals via system bus 206 that were either stored in mass storage device 212 or received by receiver 210 from a remote transmitter, such as transmitter 118 of FIG. 1. The host processor 208 temporarily stores the encoded image signals in host memory 214. Thus, decoding system 200 is a destination system and encoding system 100 is a source system.

Host processor 208 decodes the encoded image signals and scales the decoded image signals for display. Decoding the encoded image signals involves undoing the compression processing implemented by pixel processor 106 of encoding system 100 of FIG. 1. Scaling the decoded image signals involves upsampling the U and V component signals to generate full-sampled Y, U, and V component signals in which there is a one-to-one-to-one correspondence between Y, U, and V pixels in the scaled component planes. Scaling may also involve scaling the component signals to a display size and/or resolution different from the image signals as originally captured. Host processor 208 then stores the scaled decoded image signals to host memory 214 for eventual transmission to digital-to-analog (D/A) converter 202 via system bus 206. D/A converter converts the digital scaled decoded image signals to analog image signals for display on monitor 204.

Referring again to FIG. 1, encoding system 100 is preferably a general microprocessor-based personal computer (PC) system with a special purpose video-processing plug-in board. In particular, A/D converter 102 may be any suitable means for decoding and digitizing analog video image signals. Capture processor 104 may be any suitable processor for capturing digitized video image component signals as subsampled pictures. Pixel processor 106 may be any suitable means for encoding subsampled video image signals, where the means is capable of implementing a forward discrete cosine transform. Memory device 112 may be any suitable computer memory device and is preferably a video random access memory (VRAM) device. Bus 108 may be any suitable digital signal transfer device and is preferably an Industry Standard Architecture (ISA) bus or Extended ISA (EISA) bus. Bus interface 110 may be any suitable means for interfacing between bus 108 and system bus 114. In a preferred embodiment, A/D converter 102, capture processor 104, pixel processor 106, bus 108, bus interface 110, and memory device 112 are contained in a single plug-in board, such as an Intel® ActionMedia®-II board, capable of being added to a general microprocessor-based personal computer (PC) system.

Host processor 116 may be any suitable means for controlling the operations of the special-purpose video processing board and is preferably an Intel®general purpose microprocessor such as an Intel® 386, 486, or Pentium® processor. Host memory 126 may be any suitable memory device used in conjunction with host processor 116 and is preferably a combination of random access memory (RAM) and read-only memory (ROM). System bus 114 may be any suitable digital signal transfer device and is preferably an Industry Standard Architecture (ISA) bus or Extended ISA (EISA) bus. Mass storage device 120 may be any suitable means for storing digital signals and is preferably a computer hard drive. Transmitter 118 may be any suitable means for transmitting digital signals to a remote receiver and preferably transmits digital signals over PSTN lines. Those skilled in the art will understand that the encoded video signals may be transmitted using any suitable means of transmission such as telephone line (PSTN or ISDN), RF antenna, local area network, or remote area network.

D/A converter 122 may be any suitable device for converting digital image signals to analog image signals and is preferably implemented through a personal computer (PC)

-based display system such as a VGA or SVGA system. Monitor 204 may be any means for displaying analog image signals and is preferably a VGA monitor.

Referring now to FIG. 2, decoding system 200 is preferably a general microprocessor-based personal computer (PC) system similar to the basic PC system of encoding system 100. In particular, host processor 208 may be any suitable means for decoding and scaling encoded image signals and is preferably an Intel® general purpose microprocessor such as an Intel® 386, 486, or Pentium® processor. Host memory 214 may be any suitable memory device used in conjunction with host processor 116 and is preferably a combination of random access memory (RAM) and read-only memory (ROM). In an alternative preferred embodiment, decoding system 200 may also have a pixel processor similar to pixel processor 106 of FIG. 1 for decoding the encoded image signals and a display processor such as an Intel® i750® Display Processor for scaling the decoded image signals.

System bus 206 may be any suitable digital signal transfer device and is preferably an Industry Standard Architecture (ISA) bus, Extended ISA (EISA) bus, or Peripheral Component Interface (PCI) bus. Mass storage device 212 may be any suitable means for storing digital signals and is preferably a CD-ROM device. Receiver 210 may be any suitable means for receiving the digital signals transmitted by transmitter 118 of encoding system 100. D/A converter 202 may be any suitable device for converting digital image signals to analog image signals and is preferably implemented through a personal computer (PC)-based display system such as a VGA or SVGA system. Monitor 204 may be any means for displaying analog image signals and is preferably a VGA monitor.

In a preferred embodiment, encoding system 100 of FIG 1 and decoding system 200 of FIG. 2 are two distinct computer systems. In an alternative preferred embodiment of the present invention, a single computer system comprising all of the different components of systems 100 and 200 may be used to encoded and decoded video image signals. Those skilled in the art will understand that such a combined system may be used to display decoded video image signals in real-time during the capture and encoding of video signals to monitor the encoding processing. In a preferred embodiment, encoding system 100 encodes video image signals in real time to yield an encoded bitstream, and transmits the encoded bitstream to decoding system 200.

Video Conferencing Windows

Figure 3:
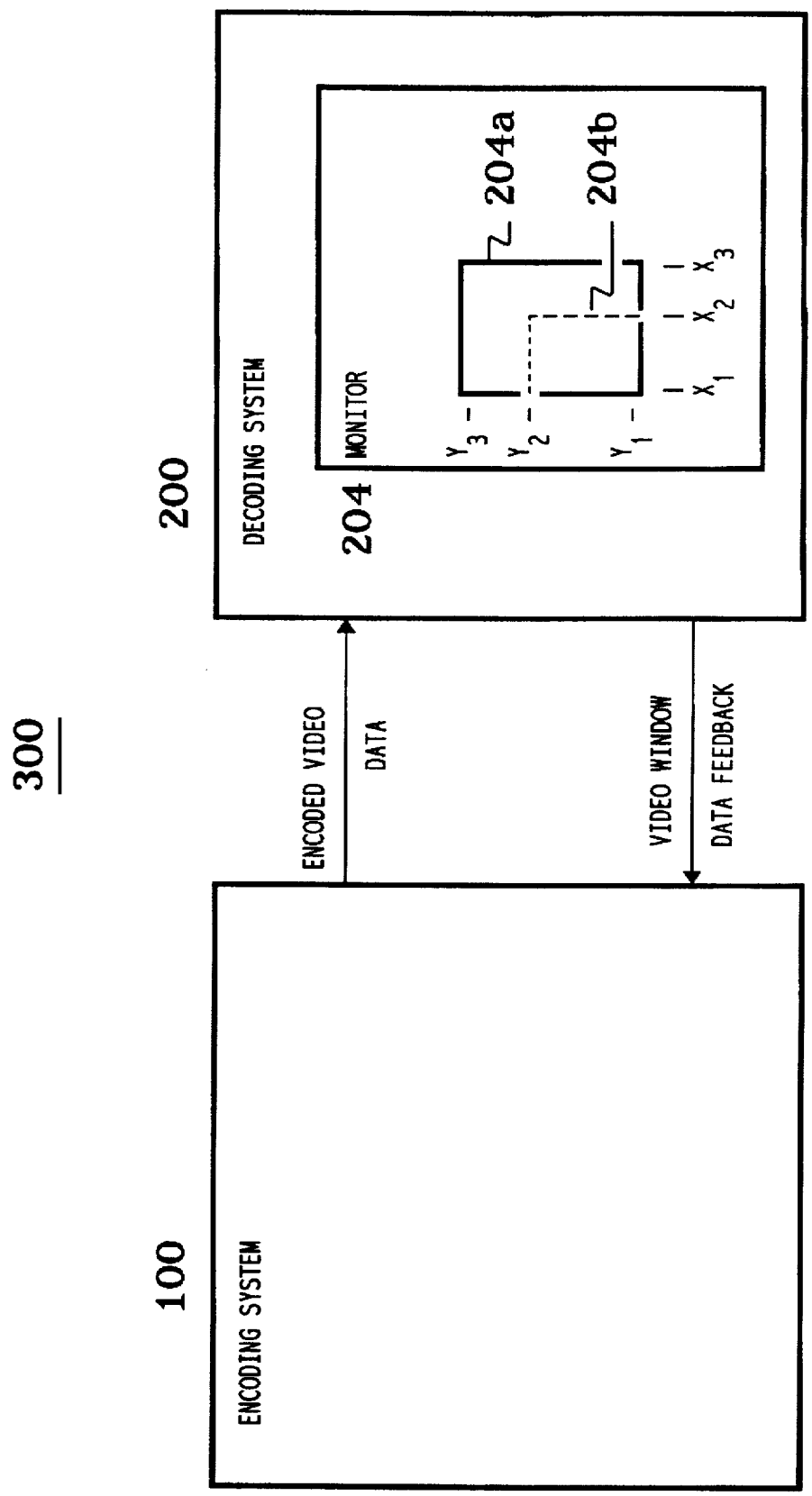
FIG. 3 is a video conferencing system with a resized display window on a monitor of the decoding system of FIG. 2, in accordance with the present invention.

Referring now to FIG. 3, there is shown a video conferencing system 300 with a resized display window 204a on monitor 204 of decoding system 200 of FIG. 2, in accordance with the present invention. Video conferencing system 300, as illustrated, comprises encoding system 100 and decoding system 200. In a preferred embodiment, video conferencing system 300 is a point-to-point video conferencing system comprising only encoding system 100 and decoding system 200, which constitute conferencing nodes of video conferencing system 300. As will be appreciated, each of these nodes may encode and transmit data to the other, and decode, process, and display encoded data received from the other system. Thus, although as illustrated encoding system 100 is a source node and decoding system 200 is a destination node, in actual operation each of these systems may both encode and decode data. Encoding system 100 and decoding system 200 communicate via a transmission medium such as an ISDN link, as will be understood by those skilled in the art.

Figure 4:
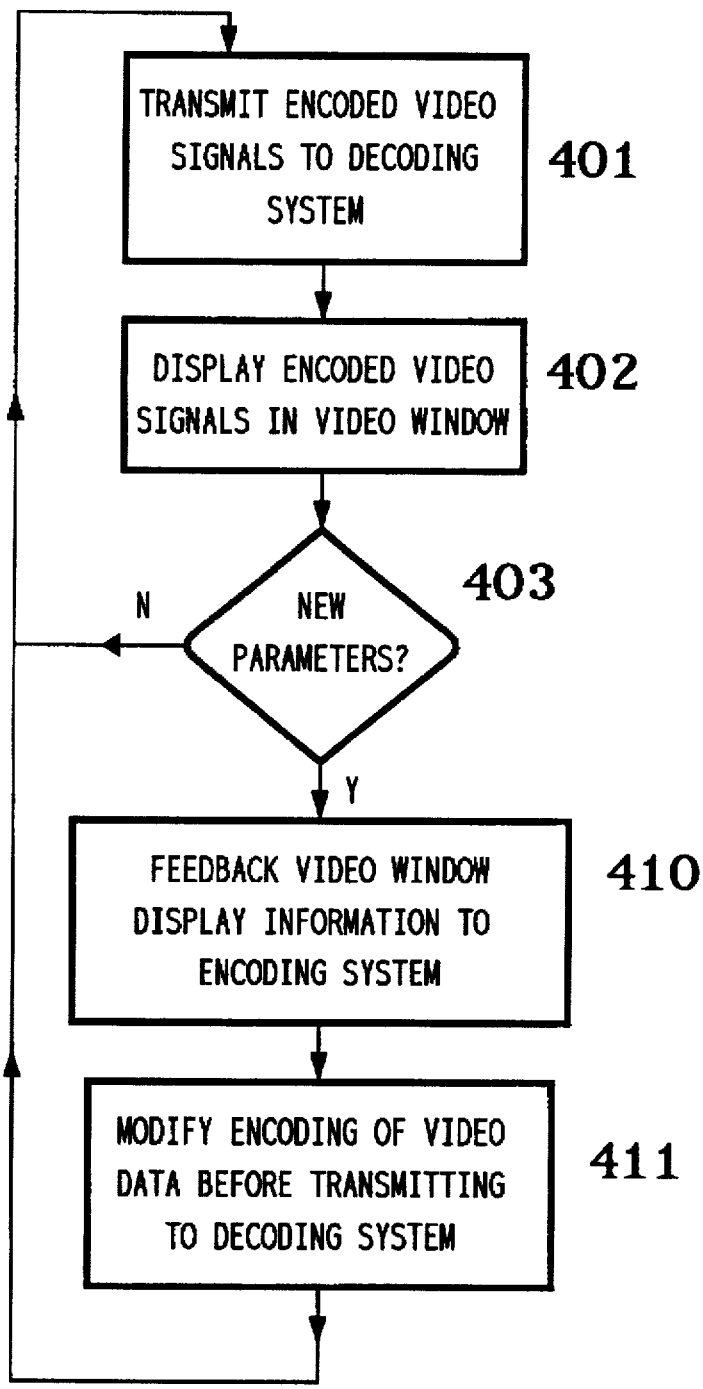
FIG. 4 is a flow chart of the method of operation of the video conferencing system of FIG. 3.

As illustrated in FIG. 3, monitor 204 of decoding system 200 may display a window 204a of data which is decoded from encoded video data transmitted by encoding system 100. As shown, display window 204a is of dimension $(X_3-X_1)$ pixels wide by $(Y_3-Y_1)$ pixels high. Referring now to FIG. 4, there is shown a flow chart 400 of the method of operation of video conferencing system 300 of FIG. 3. Initially, encoding system 100 encodes video data with a certain encoding method, presuming that default window dimensions equivalent to those of window 204a are being utilized by decoding system 200. The encoded video data or signals are then transmitted to decoding system 200 (step 401 of FIG. 4), as illustrated in FIG. 3. The encoded video signals are received by decoding system 200, decoded, and displayed in window 204a (step 402). It will be understood that decoding system 200 may display in window 204a a succession of video pictures received from encoding system 100, e.g. depicting a motion picture of the talking face of a user of encoding system 100.

Normally, encoding system 100 will encode exactly enough pixels to fill window 204a. Thus, the encoding, decoding, and transmission bandwidth is efficiently utilized. However, decoding system 200 may at some point need to change the dimensions of display window 204a. For example, the user of decoding system 200 may drag the upper right corner of window 204a with a mouse from coordinate $X_3,Y_3$ to a new coordinate $X_2,Y_2$, thereby shrinking the size and possibly changing the scale and aspect ratio of window 204a into a new window 204b. Therefore, decoding system 200 must decode the encoded video data received from encoding system 100, and then scale this data down to fit the dimensions of new window 204b. Because window 204b is smaller than window 204a, its resolution is lower and thus the image quality therein will be reduced by a certain amount.

Those skilled in the art will realize that the transmission bandwidth is inefficiently utilized in this case because more pixels are transmitted than are actually utilized by decoding system 200. Encoding bandwidth is also inefficiently utilized because encoding system 100 spends more time than is necessary encoding video data. Decoding system 200 also has to decode more data than is necessary and then perform further scaling and other processing operations upon the decoded data to display within window 204b. Thus, if decoding system continues to display the decoded video data in accordance with the same window display parameters (e.g., the same size, resolution, and quality), then encoding system continues to encode and transmit further video data as before (step 403). However, if decoding system 200 selects or receives new parameters affecting the display of video data in window 204a, then this video window display information is feedback to encoding system 100 (steps 403 and 410). Thus, encoding system 100 can modify its method of encoding the video data before encoding and transmitting the data to decoding system 200 (step 411).

In the current example, when window 204a is changed to window 204b, decoding system 200 feedsback the new window size to encoding system 100. Encoding system 100 then can determine how to most efficiently encode the video data. For example, because decoding system 200 would scale down the encoded video data transmitted in accordance with previous parameters and thus suffer quality degradation, encoding system 100 can reduce the number of bits utilized to encode the video data in the first place, since the quality of the information ultimately displayed in video display window 204b will be reduced in any event. Alternatively, encoding system 100 can use the same number of bits to encode the video data that will be displayed in window 204b, but encode them at a higher quality. The video data may be scaled before encoding by encoding system 100 to avoid the necessity of having to encode unnecessary bits, and to avoid the necessity of decoding system 200 having to scale the decoded video data. In this manner, video window data feedback from decoding system 200 to encoding system 100 may be utilized to improve the quality of encoded signals and/or to improve the transmission bandwidth efficiency.

It will be appreciated that other changes to the way decoding system 200 displays the decoded video data may be made and this information fedback to encoding system 100 to more efficiently encode the video data. For example, window 204a could be reduced in size to window 204b as described above, while keeping the display size of visible pixels the same and simply clipping or obscuring pixels that would have been displayed in the region outside window 204b but inside window 204a. In this case, feedback representing the new window parameters can be transmitted to encoding system 100, where this can be utilized by encoding system 100 to simply avoid encoding the invisible pixels in the first place. The savings can be used to increase the quality of the remaining pixels encoded or to decrease the transmission bandwidth necessary to transmit the video data to be displayed.

Alternatively, the dimensions of window 204a may remain the same, but decoding system 200 may display the decoded video data at a lower resolution or quality. For example, decoding system may display the video data only in black and white, or at half the spatial resolution, within window 204a. If this is the case, again encoding system 100 inefficiently has to encode and transmit information that is ultimately not used or displayed by decoding system 200. Therefore, if parameters of this nature relating to the display of video data in the window change, this information may be transmitted as video window data feedback to encoding system 100. Encoding system 100 will then modify the encoding process to only encode and transmit data needed by decoding system 200. Thus, if decoding system 200 instructs encoding system 100 that it is displaying all video pictures in window 204a in black and white, encoding system can encode and transmit only black and white video data, thereby saving encoding and transmission bandwidth as well as decoding bandwidth. If decoding system 200 is displaying video data at a lower resolution, encoding system 100 can first reduce the resolution of the pixels to be encoded and then encode the lower-resolution data before transmission to decoding system 200.

It will be understood that in alternative preferred embodiments, video conferencing system 300 may comprise multiple conferencing nodes other than encoding system 100 and decoding system 200.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A method for processing video signals in a source computer, the method comprising the steps of:

(a) transmitting video data to a destination computer; wherein:

the destination computer displays the video data;
    the destination computer reduces one or more of the following video data display parameters: window size, resolution, and color range; and the destination computer notifies the source computer of the reduction of the one or more video data display parameters; and (b) adjusting the transmission of video data transmitted to the destination computer in accordance with the reduction of the one or more video data display parameters.

2. The method of claim 1, wherein step (b) comprises the step of reducing the quality of video data transmitted to the destination computer in accordance with the reduction of the one or more video data display parameters.

3. The method of claim 2, wherein step (b) comprises the step of scaling video data for transmission to the destination computer in accordance with the reduction of the one or more video data display parameters.

4. The method of claim 1, wherein step (b) comprises the step of reducing the quantity of video data pixels transmitted to the destination computer when the window size parameter is reduced.

5. The method of claim 1, wherein step (b) comprises the step of transmitting only black-and-white video data when the color range parameter is reduced.

6. The method of claim 1, wherein step (b) comprises the step of reducing the quantity and increasing the quality of video data pixels transmitted to the destination computer when the window size parameter is reduced.

7. A computer for a computer system comprising a source computer and a destination computer, wherein:

the computer is one of the source computer and the destination computer;

the source computer transmits video data to the destination computer;

the destination computer displays the video data;

the destination computer reduces one or more of the following video data display parameters: window size, resolution, and color range;

the destination computer notifies the source computer of the reduction of the one or more video data display parameters; and the source computer adjusts transmission of video data transmitted to the destination computer in accordance with the reduction of the one or more video data display parameters.

8. The computer of claim 7, wherein the source computer reduces the quality of video data transmitted to the destination computer in accordance with the reduction of the one or more video data display parameters.

9. The computer of claim 8, wherein the source computer adjusts the transmission of video data by scaling video data for transmission to the destination computer in accordance with the reduction of the one or more video data display parameters.

10. The computer of claim 7, wherein the source computer reduces the quantity of video data pixels transmitted to the destination computer when the window size parameter is reduced.

11. The computer of claim 7, wherein the source computer transmits only black-and-white video data when the color range parameter is reduced.

12. The computer of claim 7, wherein the source computer reduces the quality and increases the quality of video data pixels transmitted to the destination computer when the window size parameter is reduced.

13. A computer-readable medium having stored thereon a plurality of instructions, wherein the plurality of instructions, when executed by a processor of a source computer, cause the processor to perform the steps of:

(a) transmitting video data to a destination computer; wherein:
  the destination computer displays the video data;
  the destination computer reduces one or more of the following video data display parameters: window size, resolution, and color range; and
  the destination computer notifies the source computer of the reduction of the one or more video data display parameters; and
(b) adjusting the transmission of video data transmitted to the destination computer in accordance with the reduction of the one or more video data display parameters.

14. The storage medium of claim 13, wherein step (b) comprises the step of reducing the quality of video data transmitted to the destination computer in accordance with the reduction of the one or more video data display parameters.

15. The storage medium of claim 14, wherein step (b) comprises the step of scaling video data for transmission to the destination computer in accordance with the reduction of the one or more video data display parameters.

16. The storage medium of claim 13, wherein step (b) comprises the step of reducing the quantity of video data pixels transmitted to the destination computer when the window size parameter is reduced.

17. The storage medium of claim 13, wherein step (b) comprises the step of transmitting only black-and-white video data when the color range parameter is reduced.

18. The storage medium of claim 13, wherein step (b) comprises the step of reducing the quantity and increasing the quality of video data pixels transmitted to the destination computer when the window size parameter is reduced.

* * * * *

UNITED STATES PATENT AND TRADEMARK OFFICE
CERTIFICATE OF CORRECTION

PATENT NO.     :   5,689,800
DATED          :   November 18, 1997
INVENTOR(S)    :   Terry Downs It is certified that error appears in the above-identified patent and that said Letters Patent is hereby corrected as shown below:

Column 8, line 61, after the words "reduces the" delete "quality" and insert therefor --quantity--.

Signed and Sealed this

Thirteenth Day of October 1998

Attest:

BRUCE LEHMAN

*Attesting Officer*          *Commissioner of Patents and Trademarks*